(12) United States Patent
Wang et al.

(10) Patent No.: US 12,024,072 B2
(45) Date of Patent: Jul. 2, 2024

(54) CONTROL CIRCUIT, CHILD SAFETY SEAT, AND SEAT ADJUSTMENT METHOD

(71) Applicant: Wonderland Switzerland AG, Steinhausen (CH)

(72) Inventors: Tao Wang, Steinhausen (CH); Manqun Cheng, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 17/965,797

(22) Filed: Oct. 14, 2022

(65) Prior Publication Data

US 2023/0119709 A1  Apr. 20, 2023

(30) Foreign Application Priority Data

Oct. 19, 2021 (CN) .......... 202111215254.1

(51) Int. Cl.
*B60N 2/28* (2006.01)
*B60N 2/02* (2006.01)
*B60R 21/015* (2006.01)

(52) U.S. Cl.
CPC ......... *B60N 2/2875* (2013.01); *B60N 2/0244* (2013.01); *B60R 21/01554* (2014.10); *B60N 2/2821* (2013.01); *B60N 2/2878* (2013.01); *B60N 2/2887* (2013.01)

(58) Field of Classification Search
CPC .. B60N 2/2875; B60N 2/2878; B60N 2/2887; B60N 2/2821
See application file for complete search history.

(56) References Cited

U.S. PATENT DOCUMENTS

| | | |
|---|---|---|
| 2006/0124366 A1 | 6/2006 | Le Masne De Chermont |
| 2010/0219813 A1 | 9/2010 | Ito |
| 2016/0059741 A1 | 3/2016 | Jeong |
| 2016/0207497 A1* | 7/2016 | Seal ..................... B60N 2/2872 |
| 2016/0304004 A1 | 10/2016 | Sandbothe |

FOREIGN PATENT DOCUMENTS

| | | |
|---|---|---|
| CN | 201998851 U | 10/2011 |
| CN | 103786608 A | 5/2014 |
| CN | 210212125 U | 3/2020 |
| CN | 111267696 A | 6/2020 |
| CN | 112339833 A | 2/2021 |
| DE | 10 2013 009 068 A1 | 11/2013 |
| JP | 2002-293245 A | 10/2002 |
| KR | 10-1521587 B1 | 5/2015 |
| KR | 10-1559665 B1 | 10/2015 |
| TW | 202124204 A | 7/2021 |
| WO | 2016/115366 A2 | 7/2016 |

\* cited by examiner

*Primary Examiner* — Syed A Islam
(74) *Attorney, Agent, or Firm* — Winston Hsu

(57) ABSTRACT

A control circuit according to the application is suitable for controlling an tilt angle of a carrier, wherein the control circuit includes: a sensor module, sensing a current angle of the carrier with a horizontal plane; a drive module, driving and adjusting the tilt angle of the carrier; and a control module, electrically connected to the sensor module and the drive module to output a control signal based on the current angle of the carrier with the horizontal plane, so as to dynamically adjust the tilt angle of the carrier. The application also provides a child safety seat and a method for adjusting the tilt angle between the seat and the base of the child safety seat.

9 Claims, 9 Drawing Sheets

CONTROL CIRCUIT, CHILD SAFETY SEAT, AND SEAT ADJUSTMENT METHOD

BACKGROUND OF THE INVENTION

1. Field of the Invention

The present application relates to a seat adjustment structure, a carrier with the seat adjustment structure, and a seat adjustment method.

2. Description of the Prior Art

The child safety seat is a common device that can be used by infants of different ages. The child safety seat is designed for safety of children. It can restrain children's dangerous behaviors in a vehicle during travelling, and protect children from injury in case of sudden collision and other accidents.

In order to adapt to children of different sizes or children's sitting and lying posture, the child safety seat may be provided with angle adjustment function, and for the convenience of use and operation, some safety seats are also provided with electric adjustment function. However, when the vehicle goes uphill or downhill, the tilt angle of the child safety seat will change, which will cause uncomfortable feeling to the children in the seat.

Therefore, it is necessary to propose an adjustment structure for child safety seat, can automatically sense the change of a tilt angle, and automatically adjust the tilt angle of the seat accordingly, so as to bring a better use experience and comfort to children sitting in the seat.

SUMMARY OF THE INVENTION

A control circuit according to the present application is suitable for controlling a tilt angle of a carrier, wherein the control circuit includes: a sensor module, sensing a current angle of the carrier relative to a horizontal plane; a drive module, driving and adjusting the tilt angle of the carrier; and a control module, electrically connected to the sensor module and the drive module to output a control signal based on the current angle of the carrier relative to the horizontal plane, so as to dynamically adjust the tilt angle of the carrier.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Embodiments of the application will be described in detail below with reference to the accompanying drawings, in which.

DETAILED DESCRIPTION

Although the invention is illustrated and described herein with reference to specific embodiments, the invention should not be limited to the details shown. Specifically, a variety of modifications can be made to these details within the scope of the equivalents of the claims without departing from the invention.

The directional descriptions of "front," "back," "up" and "down" involved in the disclosure are only for convenience of understanding. The present invention is not limited to these directions, but can be adjusted according to the actual situation. Although the application has been listed and described with reference to typical embodiments, the terms used are illustrative and exemplary only, rather than restrictive.

Figure 1:
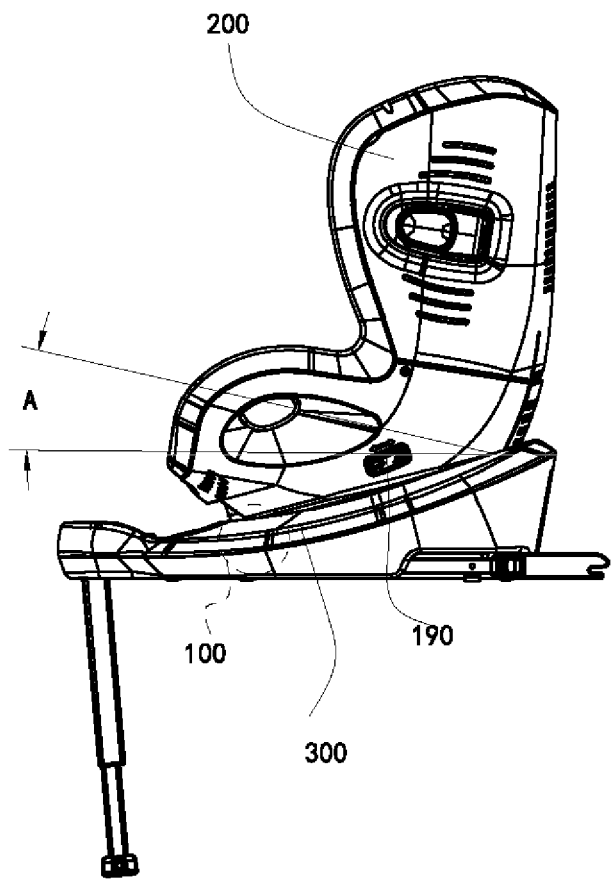
FIG. 1 is a side view of a carrier according to the application with a seat being at a first angle with respect to a base.
Figure 2:
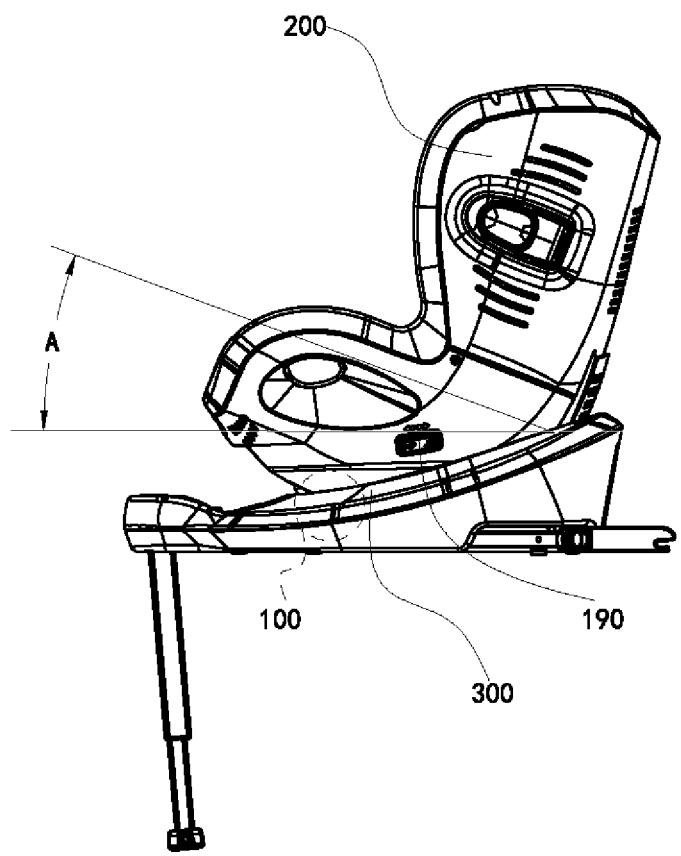
FIG. 2 is a side view of the carrier according to the application with the seat being at a second angle greater than the first angle with respect to the base.

Referring to FIGS. 1 and 2, a carrier according to the application will be described as a whole.

As shown, in the application, the carrier may be (but not limited to) a child safety seat, which includes a seat 200 and a base 300. The base 300 is a component fixed to a vehicle, and the seat 200 is a component for carrying an occupant, such as a child. For convenience of description, the left side in FIGS. 1, 2 will be termed the front of the carrier, and the right side will be termed the rear of the carrier, however, it should be understood, this does not limit the installation direction of the carrier. In fact, the carrier may be mounted on the vehicle in the forward, reverse or transverse direction. The seat 200 may slide in respect to the base 300 along an arc track roughly extending back and forth. In this way, when the seat 200 slides to different positions on the track, a tilt angle between the seat 200 and the base 300 will change. For example, in FIG. 1, the tilt angle is relative small, while in FIG. 2, the tilt angle is relative large.

By adjusting the tilt angle between the seat 200 and the base 300, it is possible to provide different sitting posture for the passengers in the carrier, such as sitting posture or lying posture. According to the seat adjustment structure 100 of the application, the tilt angle between the seat 200 and the base 300 can be automatically adjusted, such that when the tilt angle of the base 300 in respect to the horizontal plane changes (such as when the vehicle is on an uphill or downhill slope), the seat 200 can maintain its tilt angle in respect to the horizontal plane.

A block diagram of a circuit connection according to the application will be described with reference to FIG. 6. Please refer to FIGS. 1, 2 and 6A as well, the circuit part of the seat adjustment structure 100 includes a sensor module 140, a control module 170, an adjustment button 190, a drive module 130, a communication module 180, and a terminal device 185. Among them, the sensor module 140 may include a posture sensor 150 and a position sensor 160. The sensor module 140, the control module 170, and the communication module 180 have various options in their forms and installation positions, and all of them can realize the functions of the application, and the terminal device 185 is not arranged on the carrier, so these components are not shown in FIG. 1-5.

The control module 170 is electrically connected to the sensor module 140. In this embodiment, the sensor module 140 includes the posture sensor 150. The posture sensor 150 is used to sense angle between the base 300 and the horizontal plane, and send an acquired tilt angle data to the control module 170. The control module 170 calculates a motion amount of the drive module 130 according to the tilt angle acquired by the posture sensor 150, and converts the motion amount into a control signal and sends it to the drive module 130.

In some embodiments, the control module 170 may be a single chip, a microprocessor, or an embedded system, the invention is not limited thereto.

Figure 5:
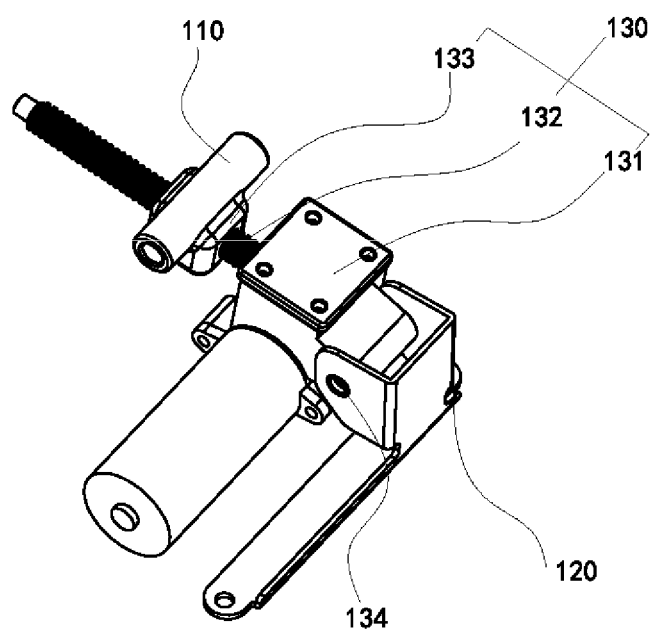
FIG. 5 is a perspective view of a seat adjustment structure according to the application.
Figure 6A:
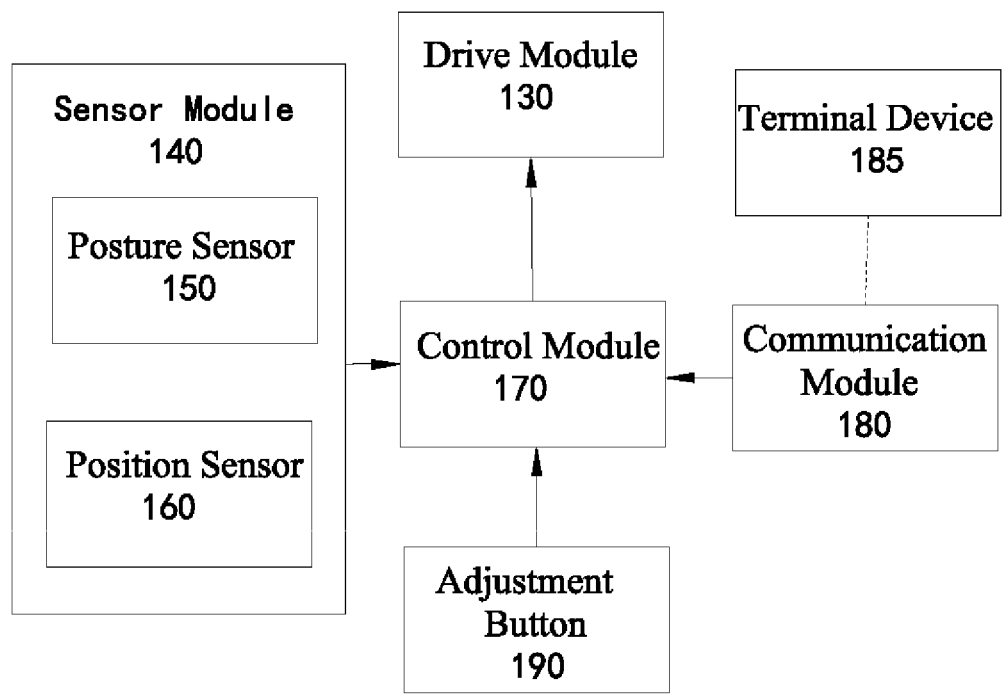
FIG. 6A is a schematic diagram of a circuit connection according to the application.
Figure 6B:
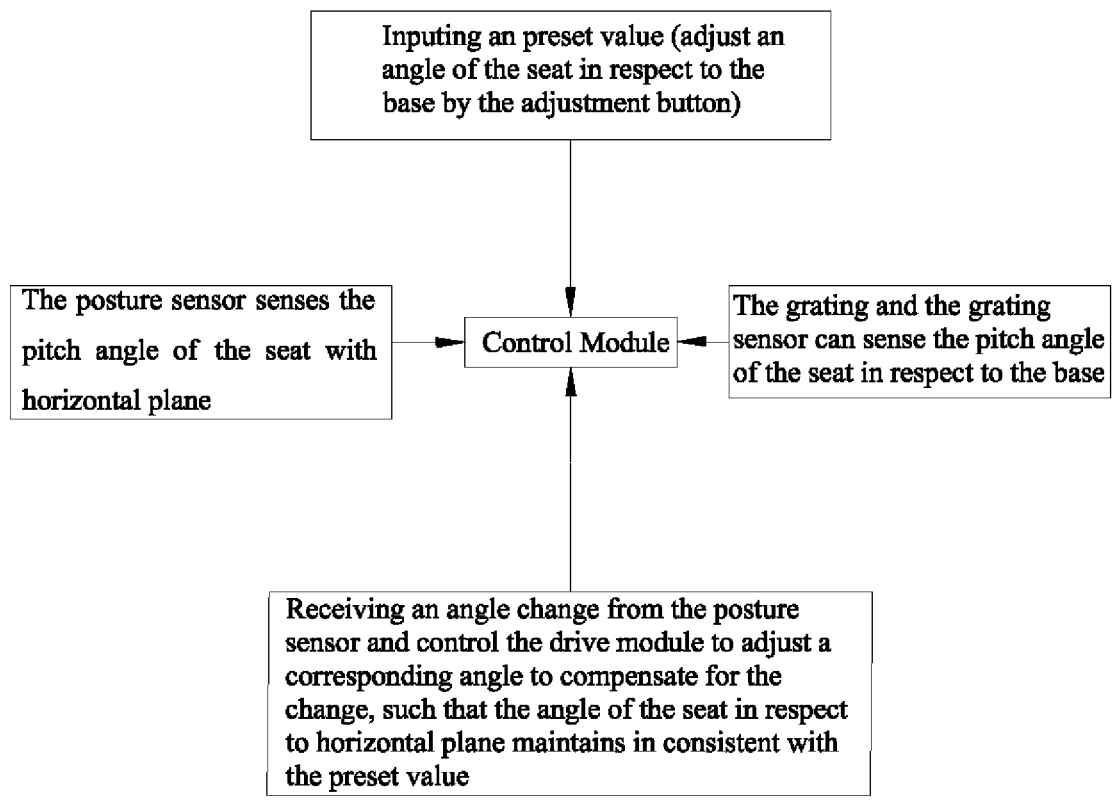
FIG. 6B is a block diagram illustrating a control relationship according to the application.

In addition, the drive module 130 is located between the seat 200 and the base 300, and includes a motor 131, a screw 132 and a nut 133 (see FIG. 5).

Figure 3:
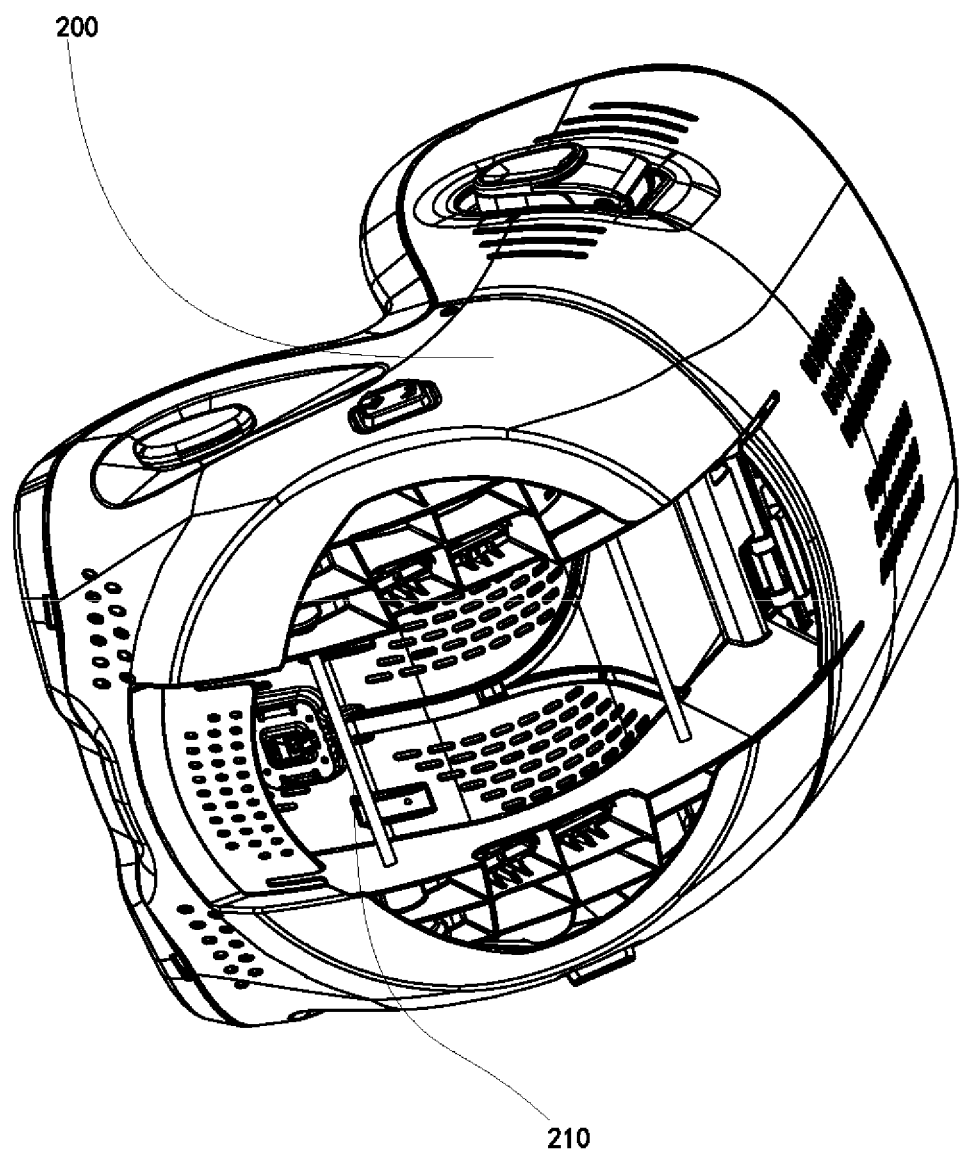
FIG. 3 is a bottom perspective view of the seat according to the application.

A connection structure of the seat 200 according to the application will be described with reference to FIG. 3.

As shown, a sliding rod 210 is disposed on a bottom of the seat 200. In this embodiment, the sliding rod 210 extends in a lateral direction, but it should be understood, the sliding rod 210 may extend obliquely or in arc, and the sliding rod 210 may be one continuous rod from left to right, or two separate rods located respectively on left and right sides. In this embodiment, two sliding rods 210 are distributed back and forth on the bottom of the seat 200 along the track direction. However, it should be understood, only one sliding rod 210 may be provided, or more than two sliding rods 210 may be provided.

Figure 4:
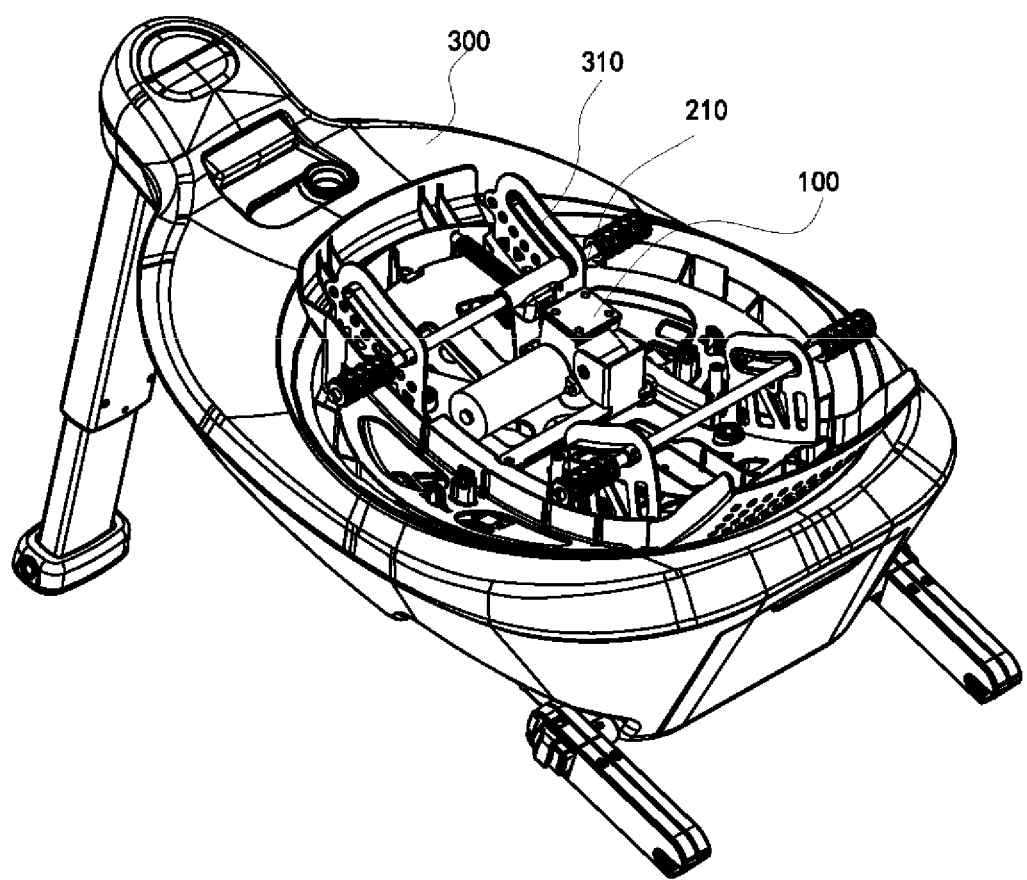
FIG. 4 is a top perspective view of the base according to the application.

A connection structure of the base 300 according to the application will be described with reference to FIG. 4.

As shown, the base 300 is provided with a sliding groove 310 extending along the track direction, and the sliding rod 210 is inserted into the sliding groove 310, so as to limit sliding of the seat 200 along the track direction. In this embodiment, two sets of sliding grooves 310 are distributed back and forth on the base 300 along the track direction, but it should be understood, only one set of sliding grooves 310 may be provided, or more than two sets of sliding grooves 310 may be provided.

The seat adjustment structure 100 is disposed in the base 300, and operatively coupled to the sliding rod 210. The seat adjustment structure 100 changes a relative tilt angle between the seat 200 and the base 300 by driving the sliding rod 210. In this embodiment, only one seat adjustment structure 100 is provided, but it should be understood, a plurality of seat adjustment structures 100 may be provided.

The seat adjustment structure 100 according to the application will be described in detail with reference to FIG. 5.

As shown, the seat adjustment structure 100 includes a first fixed member 110, a second fixed member 120, a drive module 130, and a posture sensor 150 (not shown).

The first fixed member 110 is fixed to the seat 200, at least partially located below the seat 200. More specifically, the first fixed member 110 is a transversely extending tube which is sleeved on a transverse rod of the seat 200.

The second fixed member 120 is fixed to the base 300, at least partially located above the base 300. More specifically, the second fixed member 120 is a frame with two opposite side walls, and a transverse pivot shaft 134 is set up between the two side walls.

The drive module 130 is pivotably mounted to the second fixed member 120, and a driving part of the drive module 130 is movably coupled to the first fixed member 110 in respect to the first fixed member 110. Under driving of the drive module 130, the first fixed member 110 moves to bring the seat 200 to slide along the track. The posture sensor 150 is disposed on either of the seat 200 and the base 300 to acquire a tilt angle of the seat 200 in respect to the horizontal plane, and the drive module 130 operates based on a control signal generated according to the tilt angle.

In this embodiment, the drive module 130 is pivotally connected to the second fixed member 120 through a transverse pivot shaft 134, such that the whole drive module 130 can be pivoted around a transverse axis in respect to the second fixed member 120. The drive module 130 is located between the seat 200 and the base 300, and includes a motor 131, a screw 132 and a nut 133. Among them, the motor 131 is pivotally fixed to the second fixed member 120; the screw 132, as a driving part of the drive module 130, extends along the track direction (from the motor 131 forwardly), and is coupled to a driving shaft of the motor 131 so can be driven by the motor 131 to rotate; the nut 133 is fixed to the first fixed member 110 and sleeved on the screw 132, and moves on the screw 132 with rotation of the screw 132, so as to bring the first fixed member 110 to move along the track.

The motor 131 may be driven by a battery mounted in the base 300 or be connected to a power supply of the vehicle. The posture sensor 150 may be mounted in the base 300 or the seat 200, and electrically connected to the motor 131. Such connections are known in the art and will not be described redundantly here.

When the posture sensor 150 is mounted on the seat 200, it directly acquires the tilt angle of the seat 200 in respect to the horizontal plane. When the posture sensor 150 is mounted on the base 300, it acquires the tilt angle of the base 300 in respect to the horizontal plane, and acquires the tilt angle of the seat 200 in respect to the horizontal plane by calculating through a positional relationship among the seat adjustment structure 100 and the seat 200 as well as the base 300. For example, in order to acquire a positional relationship between the seat 200 and the base 300, the drive module 130 may be provided with a grating and a grating detector (not shown), the grating is fixedly disposed on the screw 132, and the grating detector is disposed on the motor 131. When the screw 132 rotates in respect to the motor 131, the grating and the grating detector can detect and record revolutions of the screw 132, so as to calculate relative positions of the seat 200 and the base 300. In other embodiments, a counting sensor may also be mounted on the motor 131 to count the revolutions of the screw 132 in a clockwise or counterclockwise direction, and output count data to the control module 170. The control module 170 may judge the tilt angle of the seat 200 in respect to the horizontal plane based on the received count data. In other embodiments, a gyroscope may also be used to judge the tilt angle of the seat 200 in respect to the horizontal plane, the invention is not limited thereto.

In this embodiment, the screw 132 extends along a straight line, while a motion trajectory of the seat 200 is curved. Therefore, when the nut 133 moves on the screw 132, the drive module 130 correspondingly rotates around the transverse pivot shaft 134, such that the nut 133 the distance from the nut 133 to the track is substantially unchanged.

In other embodiments, the drive module 130 may be in different forms. For example, the drive module 130 may be a gear driven by the motor 131, and the first fixed member 110 may a rack extending along a track direction. The gear is engaged with the rack, thereby bring the first fixed member 110 to slide along the along the track, thus bringing the seat 200 along the track.

The position sensor 160 is arranged at both ends of the sliding groove 310, and detects a position of an end point of the seat adjustment structure 100. When the seat 200 reaches the end point under driving of the seat adjustment structure 100, the position sensor 160 sends a signal to the control module 170 to stop driving of the seat adjustment structure 100.

The adjustment button 190 is arranged outside the seat 200, and is electrically connected to the control module 170. The adjustment button 190 sends a repositioning signal to the control module 170 according to the user's operation, so as to readjust the tilt angle of the seat 200.

The seat adjustment structure 100 further includes a communication module 180. The communication module 180 is electrically connected to the control module 170 and wirelessly connected to the terminal device 185. The terminal device 185 can send a repositioning signal to the communication module 180, and the communication module 180 sends the repositioning signal to the control module 170, so as to readjust the tilt angle of the seat 200.

In some embodiments, the terminal device 185 may be a smart phone, a tablet computer, a notebook computer, a pocket computer, etc., and the communication module 180 may be a communication module such as WiFi, Zigbee, mobile network, Bluetooth, etc. In these embodiments, the caregiver can install corresponding application software, such as APP, on the terminal device 185, so as to control a tilt angle of the seat 200 by the terminal device.

The seat adjustment method according to the application will be described with reference to FIGS. 7-8.

Figure 7:
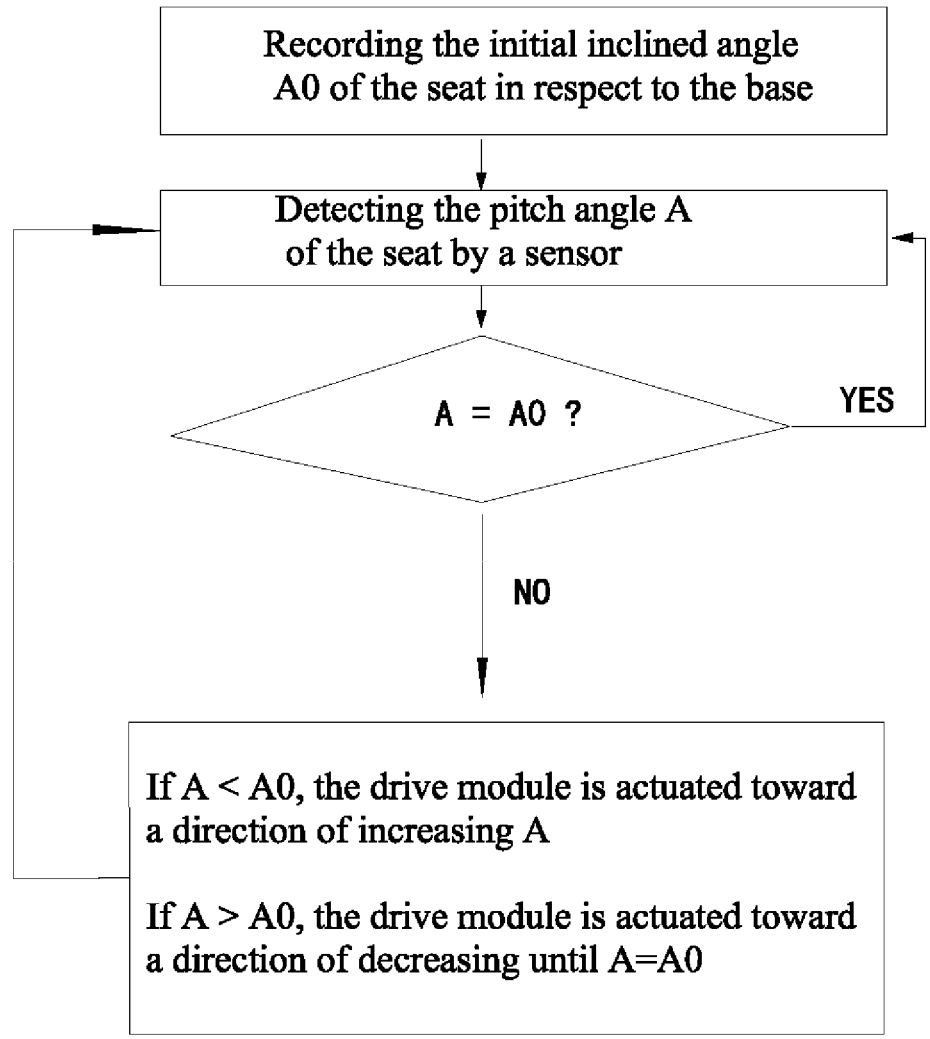
FIG. 7 is a block diagram of a control method according to one embodiment of the application.

In the embodiment shown in FIG. 7, firstly, an initial tilt angle A0 of the seat 200, i.e., a tilt angle A0 of the seat 200 in respect to the horizontal plane, is recorded. Then, the tilt angle A of the seat 200 is detected in real time by a sensor on the carrier. When A=A0 is detected, the drive module 130 on the carrier is not started. When A≠A0 is detected, the drive module 130 is started to operate toward a direction of reducing a difference between A and A0 until A=A0 is detected.

In this way, regardless of the horizontal angle of the base 300, the carrier can automatically adjust the tilt angle of the seat 200 in respect to the horizontal plane (within a range allowed by the sliding groove 310), such that the tilt angle of the seat 200 remains unchanged.

Figure 8:
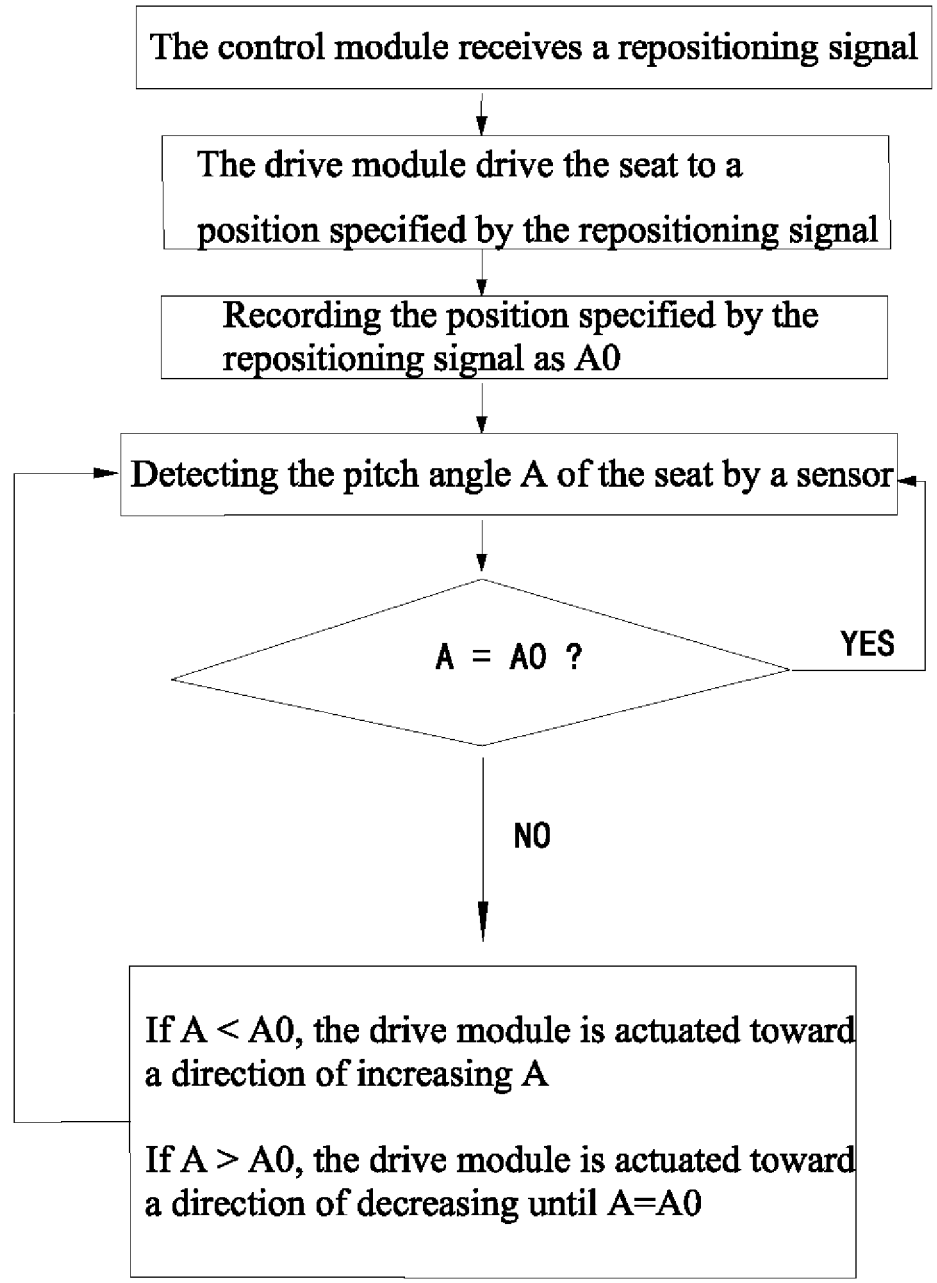
FIG. 8 is a block diagram of a control method according to another embodiment of the application.

Refer to the embodiment shown in FIG. 8. Compared with FIG. 7, a repositioning signal from the user is added in this embodiment, and other parts are the same as the embodiment of FIG. 7. Specifically, a repositioning signal is sent to the control module 170 on the carrier, and the repositioning signal specifies a predetermined angle of the seat 200 on the carrier; the control module 170 starts the drive module 130 on the carrier, drives the seat 200 to the predetermined angle, and records the predetermined angle as A0.

For example, the caregiver can set a current angle of the seat 200 with the horizontal plane as the initial A0 through the above application software. In this way, the control module 170 can dynamically adjust the angle of the seat 200 based on the set initial A0.

In this way, the user can set the tilt angle of the seat 200, set the seat 200 to a sitting or lying position. After the setting is completed, the carrier will automatically maintain the tilt angle, such that the seat 200 is remained at the angle.

In conclusion, the application provides a seat adjustment structure and a seat adjustment method of a carrier, which can automatically adjust a tilt angle of the seat, such that the seat is always maintained at a certain tilt angle. The user can also set the tilt angle to be maintained, that is, the tilt angle at which the seat will be automatically maintained after setting. In the application, the carrier is described by taking a child safety seat as an example, but it should be understood, the carrier of the present application can be any carrier in other forms.

Since the application can be embodied in various forms without departing from the spirit and essence of the application, it should be understood, the above embodiments are not limited to any of the foregoing details, but should be interpreted as broadly as possible within the scope defined in the claims. Therefore, all changes falling within the scope of claims or their equivalents should be covered by claims.

What is claimed is:

1. A child safety seat comprising:
a base;
a seat mounted on the base; and
a control circuit disposed on at least one of the base and the seat, the control circuit comprising:
  a sensor module configured to sense a current angle of the carrier base relative to a horizontal plane;
  a drive module configured to drive and adjust a tilt angle of the seat; and
  a control module electrically connected to the sensor module and the drive module to output a control signal to the drive module based on the current angle of the base relative to the horizontal plane, so as to dynamically adjust the tilt angle of the seat;
wherein:
a seat adjustment structure is adapted to adjust the tilt angle of the seat, the seat is slidable along a track and positioned in respect to the base, and the seat adjustment structure includes:
a first fixed member fixed to the seat and at least partially located below the seat; and
a second fixed member fixed to the base and at least partially located above the base, and
wherein the drive module is pivotally connected to the second fixed member through a transverse pivot shaft, such that the drive module is able to be pivoted around a transverse axis in respect to the second fixed member, a driving part of the drive module is movably coupled to the first fixed member in respect to the first fixed member, and under driving of the drive module, the first fixed member moves to bring the seat to slide along the track; and
the sensor module is disposed on either of the seat and the base to acquire the tilt angle of the seat in respect to the horizontal plane, and the drive module operates based on the control signal generated according to the tilt angle.

2. The child safety seat according to claim 1, wherein:
the drive module includes:
  a motor pivotably fixed to the second fixed member;
  a screw, as the driving part of the drive module, being coupled to a driving shaft of the motor and configured to be driven by the motor to rotate; and
  a nut fixed to the first fixed member and sleeved on the screw and configured to move on the screw with rotation of the screw to bring the first fixed member to move.

3. The child safety seat according to claim 1, wherein:
the sensor module is mounted on the seat to acquire the tilt angle of the seat in respect to the horizontal plane; or
the sensor module is mounted on the base to acquire a tilt angle of the base in respect to the horizontal plane, and acquire the tilt angle of the seat in respect to the horizontal plane by calculating through a positional relationship between the drive module and the seat.

4. The child safety seat according to claim 1, wherein:
the control module is configured to calculate a motion amount of the drive module according to the tilt angle acquired by the sensor module, and convert the motion amount into the control signal sent to the drive module.

5. The child safety seat according to claim 4, further comprising an adjustment button being electrically connected to the control module to send a repositioning signal to the control module according to a user's operation, so as to readjust the tilt angle of the sea.

6. The child safety seat according to claim 4, further comprising a communication module electrically connected to the control module and wirelessly connected to a terminal device,
- wherein the terminal device is configured to send a repositioning signal to the communication module, and the communication module is configured to send the repositioning signal to the control module, so as to readjust the tilt angle of the seat.

7. The child safety seat according to claim 1, wherein:
the sensor module includes a position sensor mounted on the drive module, when the drive module drives the sea, the position sensor records a relative movement mount of the seat; and
the control module is configured to calculate the tilt angle of the sea according to the relative movement amount of the seat.

8. The child safety seat according to claim 1, wherein the base is provided with a sliding groove, and the seat is provided with a sliding rod, the sliding rod is mounted on the first fixed member and is movable along the sliding groove with movement of the first fixed member.

9. The child safety seat according to claim 8, wherein the first fixed member is in a sleeve configuration, and the sliding rod passes through the first fixed member and protrudes from both ends of the first fixed member; and
- the sliding groove is provided by pairs for accommodating both ends of the sliding rod protruding from the first fixed member.

\* \* \* \* \*